March 5, 1940.  R. W. HASTINGS  2,192,854
CONTROL FOR REFRIGERATING APPARATUS
Original Filed May 18, 1937  2 Sheets-Sheet 1

INVENTOR
ROGER W. HASTINGS.

March 5, 1940.　　　　R. W. HASTINGS　　　　2,192,854
CONTROL FOR REFRIGERATING APPARATUS
Original Filed May 18, 1937　　2 Sheets-Sheet 2

WITNESSES:

INVENTOR
ROGER W. HASTINGS.
BY
ATTORNEY

Patented Mar. 5, 1940

2,192,854

UNITED STATES PATENT OFFICE 2,192,854

CONTROL FOR REFRIGERATING APPARATUS

Roger W. Hastings, Springfield, Mass., assignor to Westinghouse Electric & Manufacturing Company, East Pittsburgh, Pa., a corporation of Pennsylvania Application May 18, 1937, Serial No. 143,288
Renewed August 16, 1939

19 Claims. (Cl. 62—4)

My invention relates to refrigerating apparatus and has for an object to provide improved control means for such apparatus.

A further object of the invention is to vary the temperature maintained by a refrigerating element in accordance with the temperature of the air exterior of the zone refrigerated by the element.

A further object of my invention is to provide an improved mechanism for controlling the operation of a refrigerating machine conjointly in response to the temperatures of the refrigerating element and the media cooled thereby, such as the air in the food storage compartment of a refrigerator.

It is a still further object of my invention to provide an improved control mechanism for a refrigerating machine that includes a hermetically sealed switch mechanism and a snap-acting element responsive to the temperature of the refrigerating element for actuating the switch mechanism wherein the temperatures to which the snap-acting mechanism responds are varied in accordance with the temperatures of the air within the zone being refrigerated.

Another object of my invention is to maintain a substantially constant temperature of the medium to be cooled regardless of the heat load or the temperature of the air surrounding the cabinet.

These and other objects are effected by my invention as will be apparent from the following description and claims taken in connection with the accompanying drawings forming a part of this application, in which:

Reference will now be had to the drawings wherein I have shown my invention applied to a control mechanism of the type disclosed and claimed in my copending application, Serial No. 139,873, filed April 30, 1937, and assigned to the Westinghouse Electric & Manufacturing Co.

Figure 1:
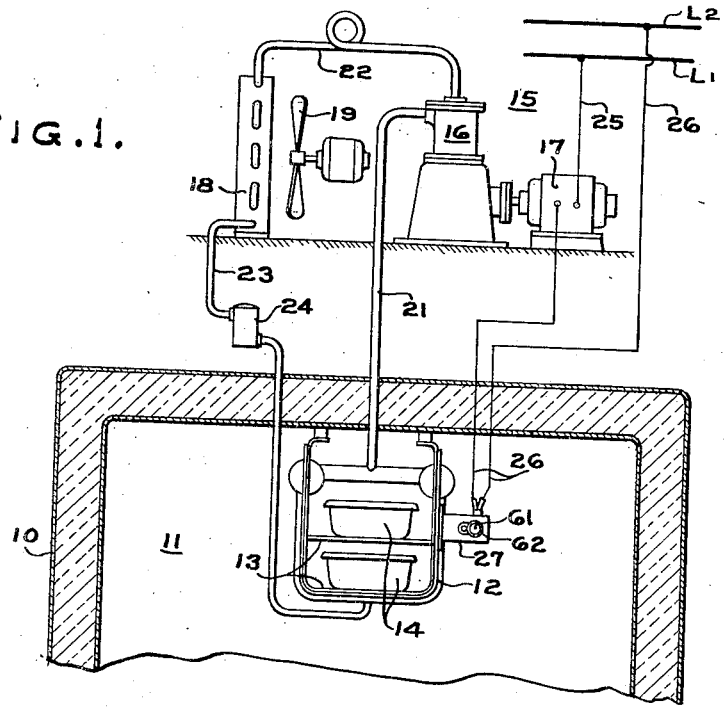
Fig. 1 is a diagrammatic view of a refrigerator having my improved control mechanism applied thereto.

In Fig. 1, I have shown a conventional domestic refrigerator cabinet 10 having a heat-insulated compartment 11 formed therein for food to be refrigerated. An evaporator 12 is disposed for cooling the air in the compartment 11 and may be provided with shelves 13 for supporting trays 14 in which fluid to be congealed is contained.

Refrigerant is circulated through the evaporator 12 by a refrigerant condensing unit shown generally at 15 and including a compressor 16, driven by an electric motor 17, and a condenser 18. The latter is cooled by a fan 19 that is preferably motor-driven as shown. Vaporous refrigerant is conveyed from the evaporator 12 through a suction conduit 21 and the compressed gas is conveyed to the condenser 18 through a conduit 22. Liquefied refrigerant passes through a conduit 23 to the evaporator 12 and is controlled by any suitable expansion device, such as, for example, a conventional high side float valve 24.

The compressor motor 17 receives electrical energy from a suitable source shown as line conductors $L_1$ and $L_2$. Conductors 25 and 26 connect the motor 17 to the conductors $L_1$ and $L_2$ as shown, the conductor 26 having my improved control device 27 connected therein. The device 27, as described hereinafter, includes provisions for starting and stopping operation of the compressor 16 and motor 17 in response to predetermined high and low temperatures of the evaporator 12. The apparatus described heretofore operates on the well known compressor-condenser-expander cycle and it is deemed unnecessary to describe in detail the operation thereof.

Figure 2:
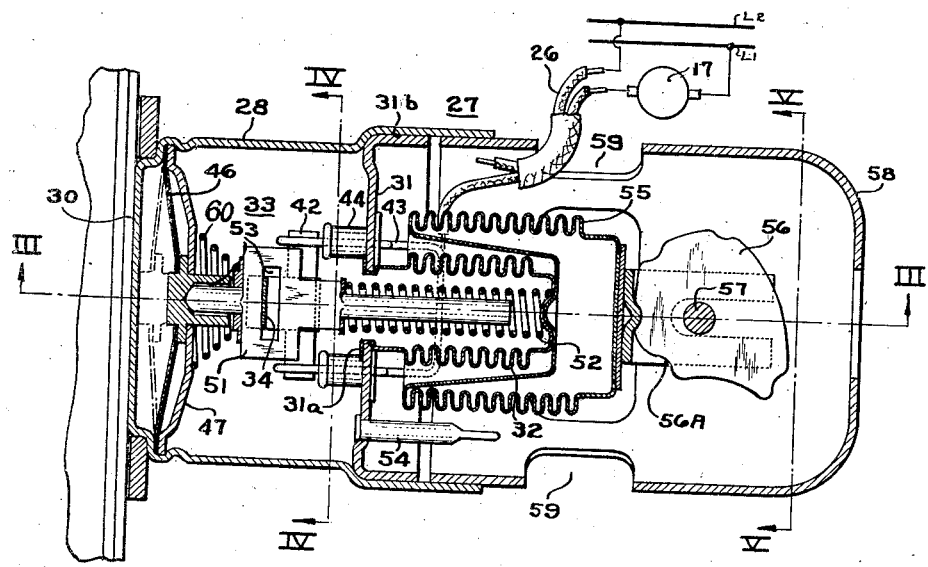
Fig. 2 is an enlarged sectional view taken in a vertical plane through the control mechanism shown in Fig. 1 and viewed from the same point; and, Figs. 3 to 5, inclusive, are sectional views taken along the lines III—III, IV—IV, and V—V of Fig. 2, respectively.
Figure 3:
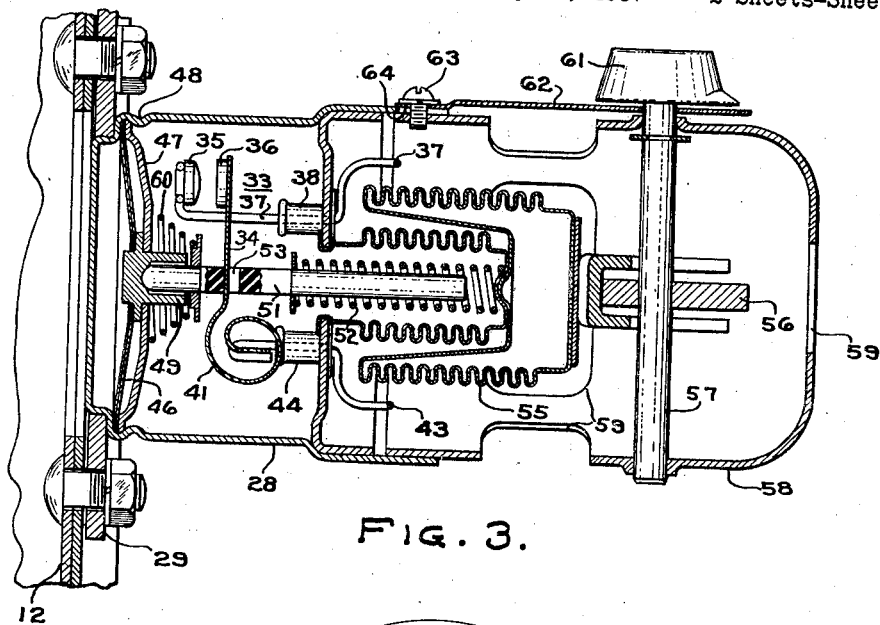

Reference will now be had to Figs. 2 to 5, inclusive, for a detailed description of the device 27 shown in Fig. 1. The latter includes a cylindrical casing 28 having mounting ears 29 that are bolted or otherwise suitably secured to the evaporator 12, a portion of which is shown in Figs. 2 and 3. The casing 28 includes an end wall 30 and is closed at its other end by a wall 31 having a flexible portion shown, by way of example, as an expansible bellows 32. The latter is soldered or otherwise suitably affixed to the wall 31 to provide a gas-tight connection at 31a. The wall 31 is soldered or otherwise connected to the casing 28 to provide a gas-tight connection at 31b.

The casing 28 and the flexible wall 31 define a hermetically sealed chamber 33 for housing a switch 34 and a thermal responsive disk 46, to be referred to more in detail hereinafter. The soldered connection at 31b is spaced from the disk 46 so that the latter will not be affected by heat when the wall 31 is affixed to the casing 28. This is a desirable feature of my control construction as thermal elements of the type shown may have their temperature characteristics seriously affected if subjected to a high temperature.

The switch 34 includes a stationary and a movable contact 35 and 36, respectively, for controlling energization of the motor 17. Support for the stationary contact may be provided by a rigid conductor 37 that extends through a pair of gas-tight insulating seals 38 in the wall 31. One portion of the conductor 26 is connected to the conductor 37 as shown at 39. The movable contact 36 is carried by a spring 41 that biases the contact 36 toward the contact 35 and which may include laterally extending portions 42 secured to a conducting strip 43, the latter extending through gas-tight insulating seals 44 in the wall 31. The other portion of the conductor 26 is connected to the strip 43 as shown at 45. I have shown four seals passing through the wall 31 so that a convenient support for the contacts 36 and 35 may be obtained and for increasing the current carrying capacity of the seals, but it will be understood that two insulating seals may be employed if desired for conducting the current to the contacts of the switch.

The switch structure 34 is actuated by the thermal responsive element or disk 46, substantially circular in shape and of bimetal construction. This type of element is well known in the art and operates in a snap-acting manner when subjected to predetermined temperatures. As shown in Figs. 2 and 3, the disk 46 is in its "switch open" position. When the temperature of the disk is raised to a predetermined value, it snaps to the position shown in broken lines and thereby moves the switch 34 to its closed position. When the temperature of the disk is reduced to a second and lower predetermined temperature, it snaps to the position shown in the drawings whereby the switch 34 is opened.

The disk 46 is disposed within a portion of the chamber 33 adjacent the evaporator 12 so that it quickly reflects changes in temperature of the evaporator 12. The disk 46 may be clamped in place at its periphery by a plate 47 and crimps 48 formed in the casing 28 as shown. A socket fitting 49 that is slidably guided by the plate 47 is fixed to and is movable with the central portion of the disk, and an insulating switch actuating yoke 51 is maintained in engagement with the socketed fitting 49 by a spring 52, the latter bearing against the inside of the flexible bellows 32. An opening 53 is provided in the yoke 51 through which the switch contact carrying spring 41 extends. In the open position of the switch 34, as shown in Fig. 3, the side of the opening 53 engages the spring 41 and maintains the contact 36 out of engagement with the contact 35.

As shown in Fig. 2, a pinch tube 54 may be secured in the wall 31 so that the chamber 33 may be filled with an inert gas before sealing, whereby oxidation of the contacts is reduced and the capacity of the switch increased.

In accordance with my invention, control of the motor 17 and compressor 16 is in response to the temperature of the evaporator 12, compensated by the load thereon. The temperature of the air in the compartment 11 is varied by the amount and temperature of the food stored in the compartment and by the temperature of the air surrounding the cabinet. These are two major factors that affect the air temperature in the compartment and the heat load on the evaporator. As the temperature of the compartment is a function of the ambient or room temperature, control of the motor is in response to the evaporator temperature compensated by the room temperature.

Accordingly, I provide means responsive directly to the temperature of the air in the compartment 11 and indirectly to the temperature of the atmosphere exterior of the compartment for varying the bias of the spring 52 and, therefore, the temperatures of the evaporator to which the disk 46 responds to open and close the switch 34. This operation results in the maintenance of the temperature of the air in the compartment more nearly at a substantially constant value. The means employed for this purpose includes a bellows 55 enclosing an expansible fluid, the pressure of which is a function of the temperature of the ambient air. Accordingly, as the temperature of the air in contact with the bellows 55 increases, the pressure therein is increased and compresses the spring 52 whereby the temperature of the evaporator 12 at which the disk 46 operates to open the switch 34 is reduced. The temperature at which the disk operates to close the switch 34 is also reduced due to the increased spring bias.

I have shown the thermostatic bellows 55 responding directly to the temperature of the air in the compartment 11 and indirectly to the outside temperature, but it will be understood that it may be made directly responsive to the outside or room temperature in accordance with my invention.

A reduction in temperature of the air in the compartment 11 effects an operation the reverse of that described heretofore. As the temperature of said air decreases, the pressure in the bellows 55 and the bias of the spring 52 is decreased so that the disk 46 effects both opening and closing of the switch 34 in response to relatively high temperatures of the evaporator 12. The mean temperature of the evaporator 12 is, therefore, reduced when the temperature of the air in the compartment 11 is increased and it is increased as the temperature of the air in the compartment 11 is reduced.

An adjustment for the operator to vary the temperature of the evaporator is provided and includes a cam 56 carried by a shaft 57 that is journalled in a cap 58, the latter being provided with a plurality of openings 59 through which the air in the compartment 11 may circulate. A handle or knob 61 is fixed to the shaft and is readily accessible to the operator as shown in Fig. 1. A plate 62 may be secured to the device 27 and provided with indicia which is readable in connection with a pointer on the knob 61 for the indication of temperature conditions within the compartment 11.

As best shown in Fig. 2, the bellows 55 bears against the cam 56 and is moved inwardly and outwardly when the cam 56 is rotated. Movement of the cam counter-clockwise as viewed in Fig. 2 increases the pressure in the bellows 55 and the bias of the spring 52 and, therefore, the disk 46 operates to close and open the switch 34 at lower temperatures of both the upper and lower temperature limits. The disk 46 operates at higher temperature when the cam 56 is rotated clockwise for reducing the pressure in the bellows 55 and the bias of the spring 52, thus raising both the upper and lower temperature limits.

Figure 4:
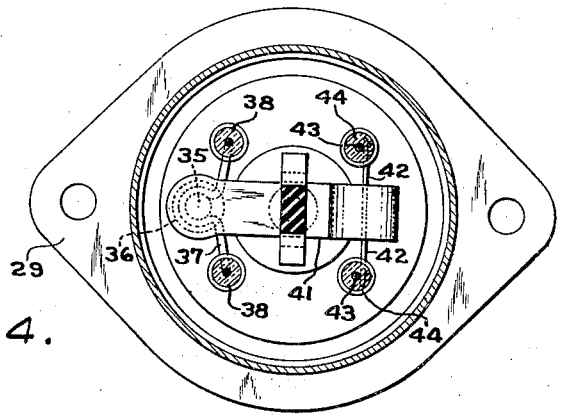
Figure 5:
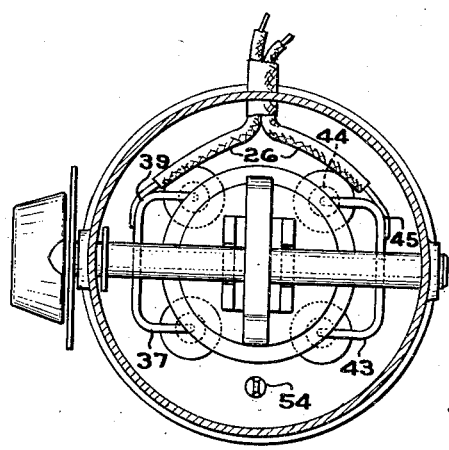

A position of the operator's adjustment may be provided, if desired, in which the switch is maintained open irrespective of the temperature of the evaporator. This feature may be effected by providing a spring 60 between the plate 47 and the yoke 51 as shown in Figs. 2, 3 and 4. The bias of this spring is less than the bias of the spring 52 in all positions of the cam 56 except the position in which the lowest portion of the cam 56, indicated at 56A, engages the bellows 55. Accordingly, in all positions, except the one noted, the spring 52 maintains the yoke 51 seated in the socketed fitting 49, whereby the yoke moves with the disk 46 and the fitting 49, for opening and closing the switch. In the position where the cam portion 56A engages the bellows 55, the bias of the spring 52 is at a minimum and is less than the bias of the spring 60. Therefore, the yoke 51 is held in its switch open position and out of engagement with the fitting 49 when the disk 46 snaps to the position shown in broken lines. An "off" position of the operator's adjustment is, therefore, provided.

One or more screws 63 (Fig. 3) may be employed for attaching the cap 58 to the casing 28 and, preferably, the casing 28 is slotted for the screws 63, as shown at 64, so that the cap 58 may be adjusted axially of the casing 28 before tightening the screws. This adjustment is independent of the operator's adjusting means and varies the spring bias and pressure of the bellows 55, whereby the temperature to which the disk 46 responds in the various portions of the operator's adjustment may be predetermined.

Operation

As shown in the drawings, the switch 34 is open and, therefore, the motor 17 is deenergized and the condensing unit 15 is inactive. When the temperature of the evaporator increases to a value, determined by the position of the cam 56 and the temperature of the air surrounding the bellows 55, the disk 46 snaps to the position shown in dotted lines and effects rapid closing of the contacts 35 and 36. The motor 17 is energized and circulation of refrigerant is initiated. When the temperature of the evaporator 12 is depressed to a value determined by the position of the cam and temperature of the bellows 55, the disk 46 snaps to the position shown for effecting rapid opening of the contacts 35 and 36. The condensing unit 15 is then rendered inactive and cooling of the evaporator element 12 is terminated.

As described heretofore, the temperatures of the evaporator 12 to which the control mechanism 27 responds to open and close its switch 34, are relatively high when the temperatures of the air in the compartment 11 and of the air exterior thereto are relatively low. Conversely, the switch opening and closing temperatures of the control mechanism 27 are relatively low during periods when the temperatures of the air in the compartment 11 and of the ambient atmosphere are relatively high. Accordingly, the mechanism 27 functions to maintain a relatively high mean evaporator temperature during periods when the temperatures of the air in the compartment 11 and of the atmosphere exterior thereof are relatively low. The control mechanism 27 operates to maintain a relatively low mean evaporator temperature when the temperatures of the air in the compartment 11 and the ambient atmosphere are relatively high.

From the foregoing it will be apparent that I have provided an improved control mechanism having a snap-acting thermal element, the operating temperatures of which are compensated by the temperature of the medium being cooled and by the temperature of the air exterior of the refrigerator compartment. Furthermore, my improved control includes a readily accessible adjustment for the convenience of the operator in varying the temperatures maintained in the refrigerated chamber and includes a position in which the refrigerating apparatus is rendered inactive.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of means defining a refrigerating zone, an evaporator disposed for cooling the media in said zone, means for circulating refrigerant through the evaporator, a switch for controlling the operation of the refrigerant circulating means, a snap-acting thermal responsive device disposed in heat transfer relation with the evaporator and responsive to predetermined high and low temperatures thereof for operating said switch and an element responsive to the temperature of the media in said zone and cooperating with the snap-acting device for varying the temperatures to which the device responds.

2. In refrigerating apparatus, the combination of means defining a refrigerating zone, an evaporator disposed for cooling the media in said zone, means for circulating refrigerant through the evaporator, a switch for controlling the operation of the refrigerant circulating means, a snap-acting thermal responsive device disposed in heat transfer relation with the evaporator and responsive to predetermined high and low temperatures thereof for operating said switch and means responsive to the temperature of the air exterior of said zone and cooperating with said snap-acting device for varying the temperatures to which it responds to operate the switch.

3. In refrigerating apparatus, the combination of means defining a refrigerating zone, an evaporator for cooling the air in the zone, a compressor for circulating refrigerant through the evaporator, a motor for driving the compressor, a switch for controlling the operation of the motor, a snap-acting thermal responsive device disposed in heat transfer relation with the evaporator and responsive to predetermined high and low temperatures thereof for operating the switch and an element responsive to the temperature of the air in said zone and cooperating with said snap-acting device for varying the temperatures to which the device responds to operate the switch.

4. In refrigerating apparatus, the combination of means defining a zone to be cooled, an evaporator for cooling the media in the zone, means for circulating refrigerant through the evaporator, a switch for controlling the operation of the circulating means, a snap-acting thermal responsive device disposed in heat transfer relation with the evaporator and responsive to predetermined high and low temperatures thereof for closing and opening the switch and a bellows containing an expansible fluid disposed in heat transfer relation with the media in the zone, said bellows providing a variable bias on said snap-acting device, whereby said temperatures to which the device responds are varied.

5. The combination as claimed in claim 4 wherein a manually actuated member engages said bellows for adjusting the bias thereof.

6. In refrigerating apparatus, the combination of means defining a zone to be cooled, an evaporator for cooling the media in the zone, means for circulating refrigerant through the evaporator, a switch for controlling the operation of the circulating means, a thermal responsive device disposed in heat transfer relation with the evaporator and responsive to predetermined high and low temperatures thereof for closing and opening the switch and a bellows containing an expansible fluid disposed in heat transfer relation with the media in the zone, said bellows providing a variable bias on said device, whereby said temperatures to which the device responds are varied, means manually operated at will for adjusting the bias of said bellows and means effective in one position of the manually-operated means for maintaining the switch open irrespective of the position of said device.

7. In refrigerating apparatus, the combination of means defining a zone to be cooled, an evaporator for cooling the air in the zone, means for circulating refrigerant through the evaporator, a switch for controlling the operation of the refrigerant circulating means, a snap-acting thermal responsive device disposed in heat transfer relation with the evaporator and responsive to predetermined high and low temperatures thereof for closing and opening the switch, a bellows containing an expansible fluid disposed in heat transfer relation with the air in the zone, said bellows being disposed in coaxial relation with said snap-acting device for providing a variable bias thereon, whereby the temperatures to which the device responds are varied and a rotatable member engaging the bellows for varying the bias thereof and having its axis disposed at an angle to the axis of the bellows.

8. In refrigerating apparatus, the combination of means defining a zone to be cooled, an evaporator for cooling the air in the zone, means for circulating refrigerant through the evaporator, a casing structure defining a hermetically sealed chamber, a switch disposed within the chamber and controlling the operation of said circulating means, an element responsive to the temperature of the evaporator for actuating the switch, a second element responsive to the temperature of the air in said zone and operatively connected to the first temperature responsive element for varying the temperatures of the evaporator to which the first element responds to actuate the switch and manually operated means for varying the temperatures to which the first temperature responsive element responds.

9. The combination as claimed in claim 8 including means effective in one position of the manually-operated means for maintaining said switch open irrespective of the temperature responsive means.

10. In refrigerating apparatus, the combination of means defining a zone to be cooled, an evaporator for cooling the air in the zone, means for circulating refrigerant through the evaporator, a casing structure secured to the evaporator and having one of its walls flexible, said casing structure defining a hermetically sealed chamber, a switch disposed within the chamber for controlling the operation of said circulating means, a spring disposed within the chamber between the flexible wall and the switch and providing a bias upon the latter, a thermal responsive element disposed in heat transfer relation with the evaporator for actuating the switch and a second thermal responsive element disposed exterior of the casing and biasing said flexible wall in opposition to the spring.

11. In refrigerating apparatus, the combination of means defining a zone to be cooled, an evaporator for cooling the air in the zone, a compressor for circulating refrigerant through the evaporator, a motor for driving the compressor, a casing structure secured to the evaporator and having one of its walls flexible, said casting structure defining a hermetically sealed chamber, a switch disposed within the chamber for controlling the operation of said motor, a spring disposed within the chamber between the flexible wall and the switch and providing a bias upon the latter, a thermal responsive element disposed in heat transfer relation with the evaporator for actuating the switch, a second thermal responsive element disposed exterior of the casing and biasing said flexible wall in opposition to the spring, and manually operated means for varying the bias of the spring whereby the temperatures to which the first thermal responsive element responds to actuate the switch are varied.

12. In refrigerating apparatus, the combination of means defining a zone to be cooled, an evaporator for cooling the air in the zone, a compressor for circulating refrigerant through the evaporator, a motor for driving the compressor, a casing having a flexible wall and defining a hermetically sealed chamber, a switch in the chamber for controlling energization of the motor, a temperature responsive element disposed in heat transfer relation with the evaporator for operating the switch, a spring bearing against one side of the flexible wall and biased in opposition to the temperature responsive element, a bellows having an expansible fluid therein disposed in heat exchanging relation with the air in said zone and subjected to the other side of the flexible wall and manually operated means for adjusting the pressure of the fluid in the bellows whereby the temperatures at which the switch is operated to initiate and terminate operation of the motor are selectively varied at will.

13. In refrigerating apparatus, the combination of means defining a zone to be cooled, an evaporator for cooling the air in the zone, a compressor for circulating refrigerant through the evaporator, a motor for driving the compressor, a snap-over element responsive to the temperature of the evaporator, a switch actuated by said element and controlling the operation of the motor, a second element responsive to the temperature of the air in said zone and mechanically connected to said first element and the switch for varying the temperatures at which said first element opens and closes the switch and means manually operated at will for selectively varying the temperatures at which the switch is operated.

14. In refrigerating apparatus, the combination of means defining a zone to be cooled, an evaporator for cooling the air in the zone, a compressor for circulating refrigerant through the evaporator, a motor for driving the compressor, a thermal responsive element disposed in heat transfer relation with the evaporator, a switch actuated by said element, and controlling said motor, a bellows opposed to said thermal responsive element and enclosing an expansible fluid in heat transfer relation with the air in said zone, and manually operated means for varying the pressure of the fluid in said bellows whereby the temperatures to which the thermal responsive element responds to open and close the switch are varied at will.

15. In refrigerating apparatus, the combination of means defining a zone to be cooled, an evaporator for cooling the air in the zone, a compressor for circulating refrigerant through the evaporator, a motor for driving the compressor, a casing having a flexible wall and defining a hermetically sealed chamber, said casing being carried by the evaporator, a thermo-responsive snap-over element disposed in heat transfer relation with the evaporator, a switch disposed within the chamber for controlling said motor and actuated by said snap-over element, a spring disposed between the snap-over element and said flexible wall, a bellows secured to said casing and defining with the flexible wall thereof a second hermetically sealed chamber for an expansible fluid, said fluid being in heat transfer relation with the air in said zone, and manually operated means for varying the pressure of the fluid of the bellows whereby the temperatures at which said switch is operated are varied.

16. The combination as claimed in claim 15 wherein the manually operated means includes a rotatable shaft, the axis of which is disposed at an angle to the axis of said snap-over element.

17. In refrigerating apparatus, the combination of means defining a zone to be refrigerated, an evaporator cooling said zone, means for circulating refrigerant through the evaporator, a switch for controlling the operation of the circulating means, an element responsive to the temperature of the evaporator, a member connecting the temperature responsive element to the switch for imparting movement of the former to the latter, a spring biasing said member and temperature-responsive element in a switch-closing direction, manually operated means for varying the bias of said spring whereby the temperature of the evaporator to which the temperature-responsive element responds to open and close the switch may be varied, and a second spring biasing said member in opposition to the first-mentioned spring and having a bias less than the bias thereof in all positions of the manually operated means wherein the switch is actuated, said manually operated means including a position wherein the bias of the first spring is less than the bias of the second spring whereby the former is ineffective to close the switch irrespective of the position of the temperature-responsive element.

18. In a thermostatic switch structure for controlling the operation of a refrigerator including a refrigerated cabinet and a refrigerating system, said refrigerating system including an evaporator disposed in the refrigerated cabinet, the combination of a switch, temperature-responsive means for actuating the switch, means for modifying the action of the temperature-responsive means comprising a mechanical force-developing device having its force varied by changes in refrigeration load, a casing for enclosing the switch and temperature-responsive means and for retaining the switch, temperature-responsive means and modifying means in closely spaced operative relation as a single package within the refrigerated space, said casing being so arranged as to be supported adjacent to the evaporator and being effective to transmit heat between the evaporator and the temperature-responsive means.

19. In a thermostatic switch structure for controlling the operation of a refrigerator including a refrigerated cabinet and a refrigerating system, said refrigerating system including an evaporator disposed in the refrigerated cabinet, the combination of a switch, temperature-responsive means for actuating the switch, means for modifying the action of the temperature-responsive means comprising a vessel containing an expansible fluid which expands and contracts in response to changes in temperature in the refrigerated cabinet, a casing for enclosing the switch and temperature-responsive means and for supporting the modifying means in closely spaced operative relation as a single package within the refrigerated space, said casing being so arranged as to be supported adjacent to the evaporator and being effective to transmit heat between the evaporator and the temperature-responsive means.

ROGER W. HASTINGS.